United States Patent [19]

Bocks et al.

[11] 4,029,534
[45] June 14, 1977

[54] COMPOSITE MATERIALS AND PROCESSES FOR THEIR PRODUCTION

[75] Inventors: Paul J. Bocks, Viersen; Jürgen Grammel, Cologne; Hermann Neumaier, Leichlingen, all of Germany

[73] Assignee: Bayer Aktiengesellschaft, Leverkusen, Germany

[22] Filed: July 14, 1976

[21] Appl. No.: 705,329

Related U.S. Application Data

[62] Division of Ser. No. 373,354, June 25, 1973, Pat. No. 3,989,870.

[52] U.S. Cl. ............................. 156/246; 156/247; 427/407 C; 428/310; 428/425; 260/2.5 AY
[51] Int. Cl.² ........................................ B32B 31/00
[58] Field of Search .............. 260/2.5 AY, 2.5 BD, 260/29.2 TN, 2.5 AD; 427/411, 412, 407; 156/246, 247; 428/310, 425, 904, 906

[56] References Cited

UNITED STATES PATENTS

| | | | |
|---|---|---|---|
| 3,537,947 | 11/1970 | Brazdzionis | 428/904 |
| 3,741,854 | 6/1973 | De Goria | 428/906 |
| 3,772,224 | 11/1973 | Marlin et al. | 260/2.5 BD |

*Primary Examiner*—William J. Van Balen
*Attorney, Agent, or Firm*—Gene Harsh; Lawrence S. Pope; Frederick H. Colen

[57] ABSTRACT

This invention discloses a composite material consisting of layers of a plastic sheet, a polyurethane ionomer latex foam and a textile material.

10 Claims, No Drawings

COMPOSITE MATERIALS AND PROCESSES FOR THEIR PRODUCTION

This is a division, of application Ser. No. 373,354, filed June 25, 1973, now U.S. Pat. No. 3,989,870.

This invention relates to the production of polyurethane foam sheets by the churning process and to composite materials produced from such foams and textile substrates or microporous or homogeneous plastics sheets.

It is known to coat textiles with polymer plastics. The object of this coating is to achieve a synergistic effect in the wearing properties of the composite material by a combination of the properties of the basic textile and of the coating material. In principle, polymers could be applied homogeneously to the substrate without an intermediate layer but it has been found advantageous to separate the plastics layer, which constitutes the actual wearing surface, from its textile support by an intermediate layer. The object of this intermediate layer is to act as a buffer between the abrasion resistant top layer and the textile base which serves as the reinforcement in order to impart a softer handle to the composite material and to improve the bond between the two main layers.

The buffer materials used in the past usually consisted either of a nap or of a compact layer of foam. The nap usually consisted of short cut fibers which had been teased out of the weft threads of the textile substrate in the case of a woven textile or out of the filling threads in the case of a knitted textile substrate, by the usual roughening processes used in the textile industry. The production of such a nap requires a high level of technical skill and is in any case not very economical because the process consists of several steps. On the other hand, the presence of a buffer layer in the composite material is essential, particularly in order to obtain a firm bond between the plastics layer and the textile substrate and especially if composite materials with good textile properties are to be produced from inferior quality textiles. Numerous attempts have therefore been made to replace the nap by a suitable buffer layer of polymer material.

In large scale commercial production, PVC foams have previously been used for this purpose. Composite materials of this kind are widely used for the manufacture of bags such as handbags and briefcases, and in the manufacture of upholstery. A serious disadvantage of such materials is that owing to the presence of plasticizers in them they are not resistant to chemical cleaning agents and, moreover, migration of the plasticizers produces undesirable changes in the properties of the textile materials.

Polyurethanes are particularly suitable for coating textiles because if suitably formulated they are extremely resistant to chemical cleaning agents and to abrasion. Both homogeneous and microporous polyurethane coatings, for example in the form of foils, have been known for some time; the textile substrates to which they are applied are high quality roughened woven or knitted goods. It is also known to cut polyurethane foams up into thin sheets which are fixed to the support material by a laminating process. It is also known to coat these composite foam materials with other polymers by direct coating or by reversal process. In spite of its advantages, however, this process also has numerous disadvantages, among which are the necessity to keep in stock a variety of selected foam plastic foils with a high unit density. Another disadvantage of the foam laminates produced from cut polyurethane foams and textile substrates is that when the laminate is coated with solutions of polyurethanes, the foam is caused to swell or partly to be dissolved by the organic solvents. It was therefore already proposed at an early stage in the history of the development of these laminates to overcome these disadvantages by producing the polyurethane foams in situ on the textile substrate by a reactive process, but attempts to realize this have previously always failed because it was not possible to produce coatings with a uniform thickness.

For this reason, attempts have also been made to apply aqueous polyurethane dispersions to the textile substrates in the form of foam. Thus in German Offenlegungsschrift No. 2,012,662 it is proposed to convert polyurethane dispersions which have been prepared using emulsifiers into finely porous foam layers by the addition of porous fillers which contain air. It is obvious that this process is not attractive from a commercial point of view because air can be introduced in this way only by means of relatively heavy fillers which would eliminate one of the advantages of foam, namely its low density combined with its high mechanical strength. On the other hand, the polyurethane dispersions used in the above mentioned Offenlegungsschrift, which are prepared in known manner in the presence of emulsifiers, are not sufficiently mechanically stable to be able to be worked up by the latex churning method to produce stable polyurethane foams in a spreadable form.

According to U.S. Pat. No. 3,479,310, polyurethane ionomer dispersions free from emulsifiers are converted into polyurethane foams by the churning process. These ionomer dispersions which are free from emulsifiers may be obtained e.g. by the processes described in U.S. Pat. No. 3,461,103, U.S. Pat. No. 3,479,310 and British Pat. No. 1,076,688. It has in practice, been found, however, that difficulties arise in foaming these dispersions by the churning process, particularly if a finely porous, stiff, spreadable foam is to be produced for the manufacture of the thin sheets or intermediate layers which, after application to the textile substrate or a transfer support, can be dried without collapsing. Although a porous foam is obtained when ionomeric polyurethane dispersions prepared by the processes mentioned above are foamed by the churning process, this foam is not three dimensionally stable but collapses, e.g. when applied with a coating knife, to form a liquid mass which when dried is only a thin, torn foil with a net-like structure. Although a foam produced from the above mentioned ionomeric polyurethane dispersions by churning can, like an ionomeric polyurethane dispersion which has not been churned, be applied as a laminate coating to a support or substrate, the polyurethane foil obtained on drying is only a thin foil with a so-called crow's-foot structure and not a finely porous, compact polyurethane foam foil of the kind required for improving the bond and handle of the composite materials described at the beginning of this text.

It has now surprisingly been found, however, that polyurethane foams which are eminently suitable for use as buffer layers for the composite materials described above can easily be produced by a churning process fron ionomeric polyurethane dispersions which are free from emulsifiers and contain foaming agents, stabilizers and crosslinking agents, if the dispersions have certain macroscopic properties as described below:

1. The dispersion must have a solids content of 45% to 62% by weight of polyurethane, preferably more than 48%.
2. The dispersion must have a relatively low viscosity in spite of its high solids content. The preferred viscosity range is from 10 to 70 seconds, most preferably from 20 to 50 seconds outflow time at 25° C from a Ford beaker with a 4mm nozzle, i.e. about 2-12 poises measured with a HAAKE Viscotester VT 180 at Stage 4.
3. The dispersion must be sufficiently finely divided to show the TYNDALL effect both with incident and with transmitted light. The particle diameter must therefore be between 0.05 and 1.0 $\mu$, preferably 0.07 to 0.30 $\mu$, measured by the method of the angle of the light scattering curve.
4. The total amount of ionic groups of the formula

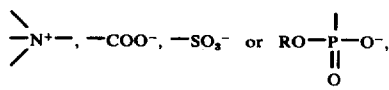

or mixtures of any of these in the polyurethane dispersion must be between 2 and 40 milliequivalents per 100 g of polyurethane solids. (R=H or lower alkyl group)

5. The tensile strength of a homogeneous polyurethane foil produced from a polyurethane dispersion as specified above without the addition of fillers, crosslinking agents, foaming agents or stabilizers must be at least 40 kg/cm².

It was also found that layers which form self-supporting, finely porous, smooth foam plastic foils after drying in a drying channel can be produced from the churned polyurethane foams by the normal spread coating processes.

These self-supporting foam sheets can be produced in very fine thicknesses (up to about 0.3 mm) but nevertheless have considerable mechanical strength and therefore with suitable precautions can easily be rolled up and transported. However, they are not so tough or tear-resistant that it would not be desirable to improve their handling properties with a suitable reinforcement.

It is found that these foams are very easy to handle and transport if they are spread on self-supporting sheets. It is known from the coating industry that polyurethane films which have a weight of about 40 g/m² and upwards give rise to coatings with such high abrasion resistance that they are easily comparable to coatings produced from other high molecular weight polymers which have more than three times their weight per square meter. There has always been a desire to produce self-supporting sheets with this low weight in a transportable form. The obstacle against this has previously been that such thin films are difficult to handle without a reinforcing layer. There has been no lack of attempts to stabilize the films by applying them to substrate fabrics or non-woven webs. This, of course, affected the properties of the films, usually not to their advantage. It has now surprisingly been found, however, that a bond between a churned foam sheet and a film, i.e. a combination between two polymer layers both of which are mechanically relatively unstable and difficult to handle, results in a material which is very easy to handle and in which neither the advantageous properties of the foam nor those of the film are in any way adversely affected.

This invention thus relates to a self-supporting polyurethane foam sheet which has been produced by the churning process from ionomeric polyurethane dispersions of the type described above, the dispersions in addition containing the following additives:

a. 1-10% by weight, preferably 3-8% by weight, of foam-stabilizing agent, based on the weight of solid polyurethane;

b. 0-100% by weight, preferably 15 to 60% by weight of inorganic fillers, based on the weight of solid polyurethane;

c. 0-30% by weight, preferably 5-12% by weight, of crosslinking agent, based on the weight of solid polyurethane;

d. 0.1 to 10% by weight, preferably 1.0 to 5.0% by weight, of thickener, based on the weight of solid polyurethane.

The invention also relates to a composite material which is composed of at least the following layers:

a. A plastics sheet, preferably a homogeneous or microporous polyurethane sheet or a PVC sheet, which preferably has a weight per square meter of 20 to 300 g/m² and a tensile strength of at least 40 kg/cm²;

b. a polyurethane latex foam obtained by the churning process which has a gross density of 0.04 to 0.40 g/cm³ (determined according to DIN 53 420).

The invention further relates to a composite material which is composed at least of the following layers:

a. a plastics sheet, preferably a homogeneous or microporous polyurethane sheet or a PVC sheet, with a weight per square meter of 20-300 g/m² preferably 20-80 g/m² and a tensile strength of at least 40 kg/cm²;

b. a polyurethane latex foam obtained by the churning process which has a a gross density of 0.04 to 0.40 g/cm³ (determined according to DIN 53 420);

c. a woven or knitted textile layer or fleece produced from a fibrous material.

This invention also relates to a composite material which consists of at least the following layers:

a. a polyurethane ionomer latex foam produced by the churning process which has a gross density of 0.04 − 0.40 g/cm³;

b. a woven or knitted textile layer or a fleece produced from a fibrous material.

The addition of foaming agents and stabilizers such as thickeners prevents the collapse of the foamed polyurethane dispersions selected according to the invention in the process of spread coating or drying. Although the additives reduce the water resistance of the foam, this effect can easily be eliminated by adding sufficient crosslinking agent to the paste to compensate, by increasing the degree of crosslinking, for the tendency of the foam to swell.

In order to obtain a stable, finely porous compact foam from ionic polyurethane dispersions by the churning process, however, the synergistic effect obtained by the combination of the additives mentioned above and dispersions which have the macroscopic properties defined above is necessary. A stable, finely porous compact foam cannot be obtained by adding the above mentioned additives to ordinary ionic polyurethane dispersions by the churning process nor is it possible by using ionic polyurethane dispersions which satisfy the conditions mentioned above without using the additives to obtain a stable, finely porous compact foam which will give rise after drying to a finely porous, smooth surface without cracks.

The ionic polyurethane dispersions used according to the invention must satisfy the conditions of fineness of subdivision, high degree of fluidity and high solids content for the following reasons:

The introduction of air into the polyurethane dispersion results in the formation of a phase of air-containing cells in a continuous phase consisting of the cell membrane formed by the dispersion. If the viscosity of the polyurethane dispersion is too high, the air cannot be stirred sufficiently uniformly into the dispersion, and consequently a foam with an irregular structure is produced. Moreover, if the viscosity is too high, transport of the dispersion through the churning apparatus becomes difficult. If the dispersed polyurethane particles are not sufficiently finely divided, their film forming capacity is impaired so that when the foam dries, i.e. when water is removed from the cell membrane, the particles do not coalesce sufficiently and the cell membrane breaks. A foam with a cracked surface is therefore obtained instead of a smooth foam. An insufficiently high solids content in the ionic polyurethane dispersion has the same effect because the continuous introduction of air into a fixed quantity of polyurethane dispersion depletes the cell membrane of substance since the same quantity of polyurethane is now required to envelop an increasing number of pores or pores with an increasing diameter. This progressive depletion of substance at some point results in breakage of the cell membrane. This can only be overcome by restricting the quantity of air stirred into the dispersion, in which case the form obtained differs little from a homogeneous sheet; otherwise, a foam with a cracked surface is obtained.

The preparation of ionic polyurethane dispersions suitable for the process of the invention is carried out by known methods as described, for example, in German Offenlegungsschrift Nos. 1,495,847 and 2,035,732 or British Pat. No. 1,076,688. It is particularly preferred to use dispersions of polyester urethanes in which the polyester component has been obtained from adipic acid and/or phthalic acid and one or more of the following glycols: Ethylene glycol, propylene glycol, 1,3-butylene glycol, 1,4-butylene glycol, 1,6-hexanediol and neopentylglycol. Polycaprolactone polyesters and polycarbonates, e.g. those of tri- and tetraethylene glycol and 1,6-hexanediol, are also particularly suitable. These high molecular weight polyols may be mixed with a limited amount of low molecular diols such as ethylene glycol, 1,4-butanediol, 1,6-hexanediol and 1,2-propyleneglycol.

The preferred diisocyanates are hexamethylene-1,6-diisocyanate, undecamethylene-1,11-diisocyanate, 1-isocyanato-3,3,5-trimethyl-5-isocyanatomethyl-cyclohexane, the isomers of tolylene diisocyanate and 4,4'- and 2,4'-diphenylmethane diisocyanate.

The chain lengthening agents used are mainly low molecular weight compounds which contain at least one hydrogen atom that is reactive with isocyanate groups, particularly glycols and diamines, which contain either an ionic group in the molecule or a group which is capable of forming an ion. Particularly preferred chain lengthening agents are e.g. the ammonium salts and alkali metal salts of aliphatic and aromatic diaminocarboxylic acids and diaminosulphonic acids, the products obtained from internal anhydrides of hydroxycarboxylic or hydroxysulphonic acids and aliphatic diprimary diamines by ring opening and neutralization with alkalies, as well as glycols and diamines which contain a tertiary nitrogen group capable of salt formation by quaternization or which contain a carboxyl group in the molecule. Examples of these preferred chain lengthening agents are: potassium lysinate, the alkali metal and ammonium salts of N-($\omega'$-aminoalkyl)-$\omega$-aminoalkanesulphonic acids and carboxylic acids, N-methyl-diethanolamine, N-methylbis-(3-aminopropyl)-amine and 2,2-dimethylolpropionic acid.

It will immediately be obvious to the expert that the requirements for fineness of subdivision, low viscosity and high solids content in the ionic polyurethane dispersions to be used according to the invention are at least to some extent contradictory. Thus while it is quite possible to prepare ionic polyurethane dispersions with a high solids content, e.g. more than 50% by weight, combined with sufficiently low viscosity, the dispersed polyurethane would have a relatively large particle diameter under these conditions. On the other hand, a very finely divided dispersion can only be achieved in the present state of the art by limiting the solids content to about 40% by weight or increasing the viscosity to outflow times of more than one minute or even to the point where the products have a pasty consistency. An ionic polyurethane dispersion which is both in a very fine state of subdivision and highly fluid and highly concentrated can only be obtained from special starting materials and only if certain conditions are observed as defined below:

a. Selection of certain NCO/OH numbers in the preparation of the prepolymer (NCO/OH number = molar ratio of diisocyanate and diol components);

b. the use of certain selected types of polyols which are found to enable highly concentrated ionic polyurethane dispersions to be obtained even if the NCO and OH number are kept at normal levels;

c. reduction of the ionic group content in the polyurethane solid to the minimum necessary for dispersing the polymer.

In the processes of the prior art, the production of finely divided and stable dispersions which on drying will give rise to polyurethane films which have optimum mechanical properties and age resistance is ensured by carrying out the preparation of the prepolymer at certain NCO/OH ratios which depend on the polyol and diisocyanate used and which may vary considerably from case to case. The ratios employed for aromatic diisocyanates are completely different from those used for aliphatic diisocyanates even if the same polyols are used although they also depend on the molecular weight of the polyol. Thus, for example, for dispersions based on adipic and phthalic acid polyesters, polyethers, polycaprolacetones and polycarbonates with an average molecular weight of 2000 (OH number 56) or mixtures of these compounds, it has been found suitable to maintain an NCO/OH ratio of about 1.7–2.0 when using aliphatic diisocyanates such as hexamethylene-1,6-diisocyanate, undecamethylene-1,11-diisocyanate, 1-isocyanato-3,3,5-trimethyl-5-isocyanatomethyl-cyclohexane or OCN-$(CH_2)_5$-COO-$(CH_2)_2$-NCO but to maintain ratios of NCO/OH less than or equal to 1.4 when using aromatic diisocyanates such as 4,4'-diisocyanato-diphenylmethane and the isomeric tolylene diisocyanates or mixtures thereof. For reacting shorter chain polyols having an average molecular weight of 800 to 1000 (OH number 140 to 112) with aliphatic diisocyanates, the preferred ratios are in the range of NCO/OH = 1.2 to 1.5.

In the said processes, the quantity of ionic chain lengthening agent used for these prepolymers should be such that the ionic groups content in the total polymer solids content is about 10 to 20 milliequivalents per 100 g of solid.

Although finely divided, stable and highly fluid polyurethane dispersions can be obtained under these conditions, the solids content of the dispersions cannot be increased substantially above 40% by weight either by reducing the quantity of water added for dispersion or by prolonged distillation of the 40% dispersion obtained without spoiling the properties of the dispersion. The products then obtained are lumpy or heterogeneous or pasty masses.

A safer method of obtaining dispersions with higher solids contents but with still the same external properties is to use less than the usual NCO/OH ratios mentioned above for the preparation of the prepolymer. A concentrated, highly fluid, finely divided and stable dispersion is obtained if the above mentioned polyols with an average molecular weight of 2000 are reacted with aliphatic diisocyanates at a molar ratio of NCO/OH = 1.4 to 1.5 or if polyols with an average molecular weight of 800 to 1000 are reacted at a molar ratio of NCO/OH = 1.1 to 1.2. Under these conditions, the optimum ionic group content is again 10 to 20 milliequivalents per 100 g of total solid but the quantity of water added may be so adjusted that an approximately 50% dispersion is obtained which is nevertheless highly fluid and finely divided.

This reduction of the NCO/OH ratios below the usual levels of course impairs the mechanical properties of the foils and foams produced from these dispersions, so that the requirement for a minimum tensile strength in the homogeneous polyurethane foil is not necessarily fulfilled. A possible means of compensating for the loss of strength in the polyurethane due to the choice of lower than the usual NCO/OH ratios is the incorporation of free glycols such as ethylene glycol, butane-1,4-diol, hexane-1,6-diol etc. in the prepolymer while maintaining the low NCO/OH ratio since the addition of such glycols improves the strength of polyurethane.

In the descriptions of several polyurethane dispersions given by way of example in this application, the tensile strength of one of the homogeneous polyurethane sheets is 250 kg/cm² (product C; from a 40% dispersion; NCO/OH = 180; cannot be foamed to a compact foam). When a sheet is produced from the same starting components but using a polyurethane dispersion with a higher solids content and a lowr NCO/OH ratio, the tensile strength drops to about 100-150 kg/cm² (products I,K; solids content approximately 50%, NCO/OH = 1.4– 1.5) but if butane-1,4-diol, for example, is incorporated in a prepolymer prepared from the same starting components at the same NCO/OH ratio, a tensile strength of 227 kg/cm² is obtained (product L).

It was found that more highly concentrated polyurethane dispersions could be prepared not only by maintaining lower NCO/OH ratios but also by using certain particular polyols, preferably phthalic acid polyesters. Phthalic acid polyesters can generally be made up into highly concentrated, finely divided, highly fluid and easily foamable dispersions even at normal NCO/OH ratios (NCO/OH approximately = 1.8; molecular weight 2000, OH number 56), but these products based on phthalic acid esters have only moderate strength and little flexibility in the cold (product G).

Another possible means of producing polyurethane dispersions which are readily foamable by virtue of their low viscosity, fine state of subdivision and high solids content is to reduce the ionic group content of a dispersion based on a prepolymer with the usual NCO/OH ratio (NCO/OH = 1.8 for a polyol with a molecular weight of 2000) to the lowest possible level. This is preferably achieved not by simply reducing the usual quantity of chain lengthening agent used but by partly replacing the ionic chain lengthening agent with a non-ionic chain lengthening agent so that the total molar quantity of chain lengthening agent remains the same. The optimum ionic group content in polyurethane dispersions is generally more than 15 milliequivalents per 100 g of solid but the ionic group content may be reduced to less than 10 milliequivalents without the dispersion coagulating. The absolute minimum quantity of ionic groups required also depends, of course, on the hydrophilic or hydrophobic character of the polyol and diisocyanate used. In product H which has been described by way of Example, replacement of about 60 mols % of the ionic chain lengthening agent ($H_2N$-$CH_2CH_2$-$NH$-$CH_2$-$CH_2$-$SO_3Na$) by nonionic diamines reduces the sulphonate group content from about 24 milliequivalents of $SO_3^-$/100 g of solid, which is the value found in the otherwise identical product C in which none of the ionic chain lengthening agent has been replaced, to about 9.5 milliequivalents of $SO_3^-$/100 g of solid, with the result that the solids content can be increased from 40 % by weight in the case of product C to about 51% by weight in product H. Consistent use of only this one, basically simple method for obtaining more highly concentrated polyurethane dispersions is, however, restricted by the properties of the polyol and diisocyanate used, which vary from case to case, since, for example, in the case of polyurethanes prepared from relatively hydrophobic polyols, the minimum quantity of ionic groups required is often so high that the solids content cannot be increased to 50%. Moreover, excessive reduction of the ionic group content generally increases the hardness of the polyurethane film and the particle size, the first of these effects deleteriously affecting the use properties of the textile material while the second effect impairs the foamability of the dispersion.

From what has been said above it will be clear that as a rule it is only by the interplay of the reduction in NCO/OH ratio by about 20% and the reduction in ionic group content, if necessary with the incorporation into the polymer of certain components which improve the strength, that one can reliably expect to obtain ionic polyurethane dispersions which by virtue of their fine state of subdivision, low viscosity and high solids content can be processed with suitable additives to produce stable, compact and finely porous polyurethane latex churned foams according to the invention.

To produce a satisfactory finely porous, open celled ionomeric compact polyurethane foam which will not collapse after spread coating and drying and will not crack, dispersions which have the features according to the invention must therefore be prepared according to selected formulations and then mixed with the additives mentioned above. Some of these formulations which are suitable for producing the ionic polyurethane dispersions according to the invention which are to be foamed have been described in the experimental portion but the invention is, of course, not limited to the examples given.

A formulation for a spread coatable paste which contains an ionic polyurethane dispersion selected for the properties described above and the additives mentioned above and which gives rise to a satisfactory finely porous, noncollapsible foam which will not crack when dry may have the following composition, for example:

a. approximately 50% aqueous anionic polyurethan dispersion
b. 1–10% by weight, preferably 3–8% by weight of foaming agent, based on solid polyurethane;
c. 0–100% by weight, preferably 15–60% by weight, of inorganic fillers, based on solid polyurethane;
d. 0–20% by weight, preferably 5–12% by weight, of crosslinking agent, based on solid polyurethane;
e. 0.1–10% by weight, preferably 1.0–5.0% by weight, of thickener, based on solid polyurethane.

The following substances are examples of suitable additives;

Crosslinking agents:
Methylolated urea products, urea condensation products and melamine products as well as formaldehyde or compounds which split off formaldehyde, e.g. semiacetals from primary or secondary alcohols and formaldehyde or hexamethylhexamethylolmelamine.

Foam-stabilizing agents:
Fatty alcohol sulphates and/or hydroxyalkylated alkylphenols and/or soaps of unsaturated and/or saturated fatty acids, preferably in approximately 30% aqueous solutions. Examples of such compounds are alkali salts of paraffinsulphonic acids, polyethers made from long-chain aliphatic alcohols or alkyl substituted phenols such as oleyl alcohol or p-nonyl phenol and epoxides like propylene oxide or ethylene oxide.

Inorganic fillers:
Chalk, talcum, kaolin, aluminum hydroxides.

Thickeners:
Sodium methyl cellulose, alkali metals salts of polyacrylic acid, alginates, polyvinyl alcohol or mixtures thereof, preferably in aqueous solutions or polyvinyl pyrrolydone.

The spread coatable, liquid foam produced from such a paste by the churning process is adjusted to a unit weight of about 400 to 900 g/liter by stirring a controlled quantity of air into it. If too much air is stirred in so that the weight per liter drops below 400 g/l, the foam becomes cracked because the pores then become too large and the pore membrane excessively depleted of substance. If one the other hand the unit weight remains above 900 g/l, the foam resembles a homogeneous polyurethane sheet on account of its low pore density. The preferred unit weight is about 600 to 700 g/l.

As already mentioned above, these foams can be made up into self-supporting finely porous smooth foam foils which have considerable mechanical stability and can be rolled up. The foam paste can be spread out to layers of less than 1 mm in thickness. These layers dry in the course of 2 to 3 minutes at 110° to 160° C with an average loss of thickness due to drying of 25 to 30%. Even very thin foam foils with a thickness of less than 0.7 mm can be produced. The foam has an open cell structure with the majority of cells in the range of 150 to 180 $\mu$. The gross density of the dry foam foils, determined according to DIN 53 420, is in the region of about 0.04–0.40 g/cm$^3$, preferably 0.15 g/cm$^3$.

It has already been mentioned above that the combination of such foam foils with thin, self-supporting plastics foils, preferably microporous or homogeneous polyurethane or PVC foils, results in valuable stable materials which have excellent handling properties and can be stored and transported without special precautions.

Thus, for example, a thin polymer film, preferably a polyurethane film, may be produced by the reversal process in known manner from an organic solution or aqueous dispersion and dried and the dry film may then be coated by a separate process with an aqueous polyurethane foam according to the invention, redried and rolled up. The resulting composite material shows no loss in any of the mechanical properties of either of its two components.

According to one variation of this process, the aqueous compact foam is first spread coated on a transfer support and dried. In a second operation, the dissolved or dispersed polymer coating composition, preferably an organic polyurethane solution or aqueous polyurethane dispersion, is then applied to the dry foam sheet by a direct coating process and dried. A composite material of homogeneous, abrasion resistant polymer layer and open cell foam layer is again obtained, with the same properties as described above.

According to another variation of this process, the aqueous compact foam is spread coated on an already solidified microporous or homogeneous sheet, preferably one made of polyurethane, conveyed e.g. on a conveyor belt, and the foam is dried on the foil. A two-layered composite material with good handling properties and an abrasion resistant surface is again obtained in which the compact polyurethane foam layer acts as stabilizing layer.

In all these variations of the process the composite material may be separated from the transfer support immediately after leaving the drying channel and rolled up or it may be left on the support.

The two layered composite material obtained in this way may be combined in a further operation with textile sheetings of all kinds by a laminating process to form a three-layered composite material. This may be carried out, for example, by applying an aqueous laminating binder or one which contains solvent either to the textile substrate or to the foam surface of the two-layered composite material by the usual methods and then combining the textile material with the two-layered material.

When using an aqueous laminating binder in the form of an aqueous polyurethane dispersion, the binder may also be applied in the form of a foam but this is not a compact polyurethane foam in accordance with the invention but one which collapses when painted on a surface and dried to result in a broken network of drying adhesive foam of the kind which is normally obtained by the churning process from polyurethane dispersions which do not have the features according to the invention and do not contain the additives according to the invention.

According to one variation of the method for producing the three-layered composite material consisting of abrasion resistant surface, compact polyurethane foam layer and textile substrate, the compact foam is first spread coated on the textile substrate and dried. This new kind of two-layered composite material can also be handled and transported quite trouble-free. An abrasion resistant top layer of organic polymer solution or aqueous polymer dispersion, preferably organic polyurethane solutions or aqueous polyurethane dispersions, may then be applied to the compact polyurethane foam layer of the material at a later date so that the same three-layered composite material is obtained after drying.

According to another variation for producing the three-layered composite material, the compact polyurethane foam applied to its support is used partly as laminating binder before it is solidified by drying. For this purpose, the material which is to be lamainated to the foam, which may be either the textile substrate or the already solidified homogeneous or microporous plastic sheet, is carefully placed on the still wet foam and gently pressed into position. This will, of course, not be carried out under a laminating pressure but with the laminating rollers adjusted to a suitable gap.

The composite textile materials obtainable by the processes described above are distinguished by their full handle, elegant drape and softness and even with inferior textiles a very firm bond is obtained between the abrasion resistant top layer of polymer and the textile without the aid of a napped surface. The surfaces of these composite materials may also be modified by the usual processes f the textile and coating industry, that is to say they may be treated with a colored or colorless finish, for example in a cloud pattern, or they may be printed or embossed by the methods normally employed in the coating industry.

The homogeneous polymer foils used as supports for the compact foam of ionomeric polyurethane latex or as starting materials for the abrasion resistant polymer top layer of the two layered or three layered composite material may be produced, for example, from the following products known in the art:

Product A

25% solution of a polyester urethane in DMF/MEK. The polyester urethane was produced from
  100 parts polyester from adipic acid and butane-1,4-diol (OH-number 50)
  7 parts butane-1,4-diol
  30 parts 4,4'-diphenylmethane diisocyanate.

A homogeneous foil produced from this solution has the following mechanical properties:
  Tensile strength: 500 kg/cn$^2$
  Elongation at break: 600%
  Shore hardness A: 85

Product B

25% solution in DMF/MEK of a polyesterpolycarbonate urethane produced from
  30 parts of a copolyester of adipic acid, ethylene glycol and butane-1,4-diol (OH-number 56)
  30 parts of hexane-1,6-diol polycarbonate (OH-number 56)
  8 parts of butane-1,4-diol and
  30 parts of 4,4'-diphenylmethane diisocyanate.

A homogeneous foil produced from this solution has the following mechanical properties:
  Tensile strength: 500 kg/cm$^2$
  Elongation at break: 500%
  Shore hardness A: 92

Product C

Aqueous anionic polyurethane dispersion free from emulsifier prepared from 0.125 mol of a copolyestr of adipic acid, hexane-1,6-diol and neopentyl glycol (OH number 66), 0.226 mol of hexamethylene-1,6-diisocyanate and 0.063 mol of the condensation product of ethylene diamine and sodium 2-hydroxyethanesulphonate as ionic chain lengthening component. Polyurethane solid content: 40% by weight. Outflow time from Ford measuring cup approximately 20 seconds (4 mm nozzle).

A homogeneous foil produced from this dispersion has the following mechanical properties:
  Tensile strength: 250 kg/cm$^2$
  Elongation at break:: 700%
  Shore hardness A: 65.

Product D

Aqueous anionic polyurethane dispersion free from emulsifier prepared from 0.30 mol of a polyester of adipic acid and hexane-1,6-diol (OH number 134), 0.09 mol of butane-1,4-diol, 0.49 mol of hexamethylene 1,6-diisocyanate and 0.06 mol of the condensation product of ethylene diamine and sodium 2-hydroxyethanesulphonate as ionic chain lengthening component. Polyurethane solid content: 40% by weight, outflow time approximately 60 seconds (4 mm nozzle).

The homogeneous sheet produced from this dispersion has the following mechanical properties:
  Tensile strength: 450 kg/cm$^2$
  Elongation at break: 5705
  Shore hardness A: 92.

Product E

PVC plastics solution consisting of:
  58 parts by weight of PVC emulsion (K-value 80)
  40 parts by weight of plasticiser (di[2-ethyl-hexyl]phthalate)
  2 parts by weight of epoxide plasticizer (epoxidised fatty acid ester)
  1 part by weight of stabilizer (dialkyl tin maleic acid semiester)
  10 parts by weight of filler
  3 parts by weight of pigments.

The homogeneous sheet obtained from this PVC coating compound has the following mechanical properties:
  Tensile strength: 120 kg/cm$^2$
  Elongation at break: 410%
  Shore hardness A: 61.

Product F

A microporous polyurethane foil used as support for the polyurethane latex compact foam or a microporous polyurethane top layer for the three-layered composite material may be prepared, for example, according to DAS 1 270 276 by coagulation of a polyurethane solution with non-solvent. A commercially produced sheet of this kind has the following mechanical properties:
  Thickness: 0.35 mm
  Unit weight: 0.65–0.67 g/cm$^3$
  Tensile strength: 60–80 kg/cm$^2$
  Elongation at break: 300–400 %.

The following aqueous anionic polyurethane dispersions which have the properties according to the invention are suitable for use as dispersion components for the ionomeric polyurethane latex compact foams produced by the churning process. When coated on a surface and dried they constitute a finely porous, stable, unbroken foam.

Product G

Aqueous dispersion from 0.125 mol of a polyester of phthalic acid and hexane -1,6-diol (OH number 56), 0.225 mol of hexamethylene-1,6-diisocyanate and 0.063 mol of the condensation product of ethylene diamine and sodium 2-hydroxyethanesulphonate.

Solids content: 48% by weight of polyurethane
Outflow time: approx. 45 seconds/4mm nozzle
Particle size: ~ 150 m $\mu$ (TYNDALL effect).

The homogeneous sheet obtained from this dispersion has the following mechanical properties:
Tensile strength: 67 kg/cm$^2$
Elongation at break: 107%
Shore hardness A: 60

Product H

Aqeuous dispersion from 0.250 mol of a copolyester of adipic acid, hexane-1,6-diol and neopentyl glycol (OH number 66), 0.450 mol of hexamethylene-1,6-diisocyanate and a mixture of chain lengthening agents of 0.08 mol of ethylene diamine and 0.05 mol of the condensation product of ethylene diamine and sodium 2-hydroxyethanesulphonate.

Solid content: 51% by weight of polyurethane
Outflow time: approx. 40 seconds/4 mm nozzle
Particle size: approx. 200 m $\mu$ (TYNDALL effect).

The homogeneous sheet obtained from this dispersion has the following mechanical properties:
Tensile strength: 260 kg/cm$^2$
Elongation at brak: 870%
Shore hardness A: 73.

Product I

Aqeuous dispersion from 0.25 mol of a copolyester of adipic acid, hexane-1,6-diol and neopentyl glycol (OH number 56), 0.375 mol of hexamethylene-1,6-diisocyanate and 0.06 mol of the condensation product of ethylene diamine and sodium 2-hydroxyethane sulphonate as ionic chain lengthening component.

Solids content: 52.5% by weight of polyurethane
Outflow time: approx. 36 seconds/4 mm nozzle
Particle size: approx. 150 $\mu$ m (TYNDALL effect)

The homogeneous sheet obtained from this dispersion has the following mechanical properties:
Tensile strength: 108 kg/cm$^2$
Elongation at break: 1200%
Shore hardness A: 48

Product K

Aqueous dispersion from 0.25 mol of a copolyester of adipic acid, hexane-1,6-diol and neopentylglycol (OH number 66), 0.35 mol of hexamethylene-1,6-diisocyanate and 0.052 mol of the condensation product of ethylene diamine and sodium 2-hydroxyethanesulphonate as ionic chain lengthening component.

Solids content: 51% by weight of polyurethane
Outflow time: approx. 25 seconds/4 mm nozzle
Particle size: ~ 150 $\mu$ m (TYNDALL effect)

The homogeneous sheet obtained from this dispersion has the following mechanical properties:
Tensile strength: 147 kg/cm$^2$
Elongation at break: 1200%
Shore hardness A: 45

Product L

Aqueous dispersion from 0.15 mol of a copolyester of adipic acid, hexane-1,6-diol and neopentyl glycol (OH number 56), 0.07 mol of a polyester of adipic acid and hexane-1,6-diol (OH number 134), 0.03 mol of butane-1,4-diol, 0.35 mol and hexamethylene-1,6-diisocyanate and 0.052 mol of the condensation product of ethylene diamine and sodium 2-hydroxyethane sulphonate as ionic chain lengthening component.

Solids content: 46% by weight of polyurethane
Outflow time: approx. 40 seconds/4 mm nozzle
Particle size: approx. 200 m $\mu$ (TYNDALL effect).

The homogenous sheet obtained from this dispersion has the following mechanical properties:
Tensile strength: 277 kg/cm$^2$
Elongation at break: 990%
Shore hardness A: 51.

All the above mentioned ionic, aqueous, emulsifier-free polyurethane dispersions may be prepared, for example, by the following general method of procedure described in British Pat. No. 1,076,688 or in German Offenlegungsschrift No. 2,035,732:

The polyhydroxyl compound is dehydrated in a water-jet vacuum at 120° C for 30 minutes and any low molecular weight diol used is added after cooling of the polyhydroxyl compound to 80° C. This polyol or polyol mixture is then reacted solvent-free with the diisocyanate. When the NCO number is equal to or slightly below the theoretical NCO number, the reaction product is cooled to 60° C and taken up in acetone or tetrahydrofuran. To this solution is added the aqueous solution of a chain lengthening agent which must contain at least one hydrogen atom which will react with isocyanate groups and at least one salt-type groups or group which is capable of salt formation, and the isocyanate groups of the prepolymer should preferably react with the chain lengthening agent. When the reaction has been completed, water is added and the acetone is distilled off under vacuum.

The aqueous polyurethane dispersions C and D cannot be prepared in concentrations of more than about 43% of PU solid and therefore can only be used as supports for the compact latex foam, as top coating for the three layered composite material or as bonding layer. If used as bonding layer, they may be applied as foamed dispersions if desired, but this bonding foam must not be confused with the compact foam according to the invention because it collapses on drying to result only in a cracked polyurethane sheet with a crow's-foot surface.

Dispersions G-L, on the other hand, have the required features according to the invention for producing the compact foam so that when mixed with the appropriate additives they can be worked up in finely porous, stable foams which will not collapse and into composite materials produced from such foams. Foams which have the required gross density of 0.04 to 0.40 g/cm$^3$ (DIN standard 53 420) mentioned above may be obtained, for example, in continuously operating churning machines produced by EUR-O-MATIC (Holland) and OAKS (England) among others.

EXAMPLE 1

Self-supporting foil of compact foam produced from a churned polyurethane latex foam:
Foam formulation:
639 Parts by weight of PU dispersion G 15 parts by weight of foam stabilizing agent: Mixture of 63% by weight of paraffinsulphonic acid sodium; 5% of a polyether of 1 mol of oleyl alcohol and 20 mols of ethylene oxide; 5% of a polyether of 1 mol of p-isononyhlphenol and 10 mols of ethylene oxide; 4% of paraffin; 3% of NaCl; 20% of $H_2O$ 50 parts by weight of chalk 30 parts by weight of 2.5% aqueous sodium methyl cellulose solution.

This paste was foamed up in a churning apparatus to a unit weight of about 600 to 700 g/liter. The resulting foam had an open-cell structure with an average pore size of 150 to 180 $\mu$ and could be applied in thin layers of 0.3 to 3.0 mm to a siliconized transfer support by coat knifing in a spreading machine. After drying in the drying channel (3 minutes at 160° C) and cooling to room temperature, a finely porous foam layer was obtained which could easily be stripped from the support and rolled up. The loss in thickness of the foam layer by drying was on an average 25 to 30%.

EXAMPLE 2

Composite material consisting of a twilled cotton and compact foam:

The foam paste described in Example 1 was spread coated in a layer thickness of 1.0 mm onto the smooth side of a cotton fabric in a spreading machine. The coated material was then dried in the drying channel under the same conditions as in Example 1. The resulting material can be rolled up after cooling without the risk of sticking.

EXAMPLE 3

Composite material of PVC top coating and compact foam:

Product E was spread coated on a fine grained transfer paper and gelled in the drying channel. Without detaching the foil from the transfer support, a foam produced by churning a polyurethane dispersion prepared according to the following formulation was now applied by spread coating in a layer thickness of 0.7 mm;

590 parts by weight of PU dispersion (Product H)

15 parts by weight of a 30% solution of the sodium salt of sulphonated paraffin (Sulfapon 102, Henkel)

150 parts by weight of aluminum hydroxide $Al_2O_3$. 10 $H_2O$ 15 parts by weight of a 55 % aqueous solution of hexamethylhexamethylolmelamine 12 parts by weight of polyvinyl pyrrolidone.

The material was then dried in the drying channel at 150° C for 2 minutes. The foam coated foil was separated from the transfer paper after cooling and could then easily be rolled up and subsequently laminated to a support material.

EXAMPLE 4

Composite material of polyurethane top coating and compact foam:

The churned foam described in Example 3 was applied in a layer thickness of 0.6 mm to a water resistant transfer support by the doctor roll coating process. The foam was then dried in the drying channel at 160° C for 2 to 3 minutes. Without removing the foam from its support, a pigmented 25 % solution of product A was now applied in a separate operation using a rubber blanket coater.

This coating was then dried for 2 to 3 minutes at 90° to 140° C. When the coating has cooled down, the transfer support was removed and the material rolled up. Depending on the quantity of polyurethane solution applied, the plastics foils obtained had a very high bulk and microporous to homogenous structure.

EXAMPLE 5 (Comparison experiment)

Composite material of PVC top coating, bonding layer based on a dispersion and textile material.

A PVC solution (product E) was applied to a transfer support by doctor roll coating as described in Example 3. When the film had gelled in the drying channel, a bonding foam of the following composition was applied in a separate operation by doctor roll coating to form a layer 0.7 mm in thickness:

1000 parts by weight of Product C 20 parts by weight of polyvinyl pyrrolidone.

While the foam was still liquid, before it had dried, several textile materials (woven or knited cotton fabric or fleece of polyamide fibres) were backed on to it by light pressure. The foam was then dried at 160° C for 3 minutes and when cool the transfer support was removed.

Since the dispersion did not have the features according to the invention, the foam collapsed on drying to result in a material which was distinctly inferior in its properties (handle, suppleness, etc.) to the three-layered composite materials according to the invention.

EXAMPLE 6

A top coat was applied wet from a pigmented 27% solution of Product B in DMF/MEK to a fine grained transfer paper by doctor roll coating to form a layer weighing 180 g/m² which was then dried at 90 to 140° C for 2 to 3 minutes.

Without detaching the film from its transfer support, a foam produced from the following formulation by churning was then applied by doctor roll coating to form a layer 0.5 mm in thickness:

385 parts by weight of Product K 10 parts by weight of potassium oleate (30% solution)

5 parts by weight of polyvinyl pyrrolidone 10 parts by weight of 55% aqueous solution of hexamethyl-hexamethylolmelamine.

While the foam was still liquid, a cotton knit fabric weighing 130 g/m² was laminated into it by a slight pressure. The foam was then dried at 160° C for 3 minutes. The transfer support could easily be removed after cooling. The artificial leather obtained in this way had a fine grained, leatherlike surface and a very soft, bulky and pleasant handle. The coated material was particularly suitable for the manufacture of outerwear garments.

EXAMPLE 7

Composite material of microporous polyurethane foil, compact foam and textile material.

A 30% solution of two-component polyurethane dissolved in ethyl acetate was applied as contact adhesive by means of a rubber blanket coater to a fabric coated with churned foam as described in Example 2. After evaporation of the solvent in the drying channel the material was laminated with a microporous polyurethane foil (Product F) by application of a powerful roller pressure. A strong, high bulk artificial leather was obtained which may be used as upholstery material.

EXAMPLE 8

Composite material of foam foil and top coating:

A top coating obtained from a polyurethane dispersion of the following formulation which had not been foamed:

1000 parts by weight of PU dispersion (Product D)
100 parts by weight of a fine paste of dye pigment (Helioecht T; Bayer)
20 parts by weight of Polyvinyl pyrrolidone, was applied to a grained waterproof transfer support by doctor roll coating.

The quantity was so calculated that after drying at 90° to 140° C, the PU film had a unit weight of 40 g/m². Without detaching the film from the transfer support, a foam of the following composition produced in a Eur-O-Matic foam churner was applied by spread coating in the next operation:

286 parts by weight of PU dispersion (Product I)
15 parts by weight of a 30% solution of the sodium salt of a sulphonated paraffin
75 parts by weight of chalk
15 parts by weight of a 2.5% solution of sodium methyl cellulose
10 parts by weight of 55% aqueous solution of hexamethylhexamethylolmelamine.

The foam was applied with a doctor roll to form a layer 0.8 mm in thickness. It was dried at 150° C for 2 to 3 minutes. After cooling, the foam coated PU foil could easily be separated from its support and rolled up to be subsequently laminated to a support material.

EXAMPLE 9

Three layered composite material
A top coating consisting of
1000 parts by weight of Product C
100 parts by weight of a fine pigment paste (Helioecht T; Bayer)
20 parts by weight of Polyvinyl pyrrolidone was applied to a water resistant transfer support by doctor roll coating and dried at 90 to 140° C. When dry, the polyurethane foil had a weight of 40 g/m². Without separating the film from its support, a foam of the following formulation produced by the churning process was applied as a layer 0.8 mm in thickness:

435 parts by weight of Product L
15 parts by weight of a 30 % solution of the sodium salt of a sulphonated paraffin
75 parts by weight of aluminum hydroxide Al$_2$O$_3$.10-H$_2$O
20 parts by weight of 55% aqueous solution of hexamethyl-hexamethylolmelamine
15 parts by weight of a 2.5% solution of sodium methyl cellulose.

The foam was then dried at 150° C for 2 – 3 minutes.
A laminating adhesive consisting of
1000 parts by weight of product C and
20 parts by weight of Polyvinyl pyrrolidone was then applied by spread coating using a rubber blanket coater with the doctor knife adjusted to a gap of 0.2 mm and a cotton fabric without a nap was then applied by light pressure and the material was dried at 160° C. The material could easily be detached from the transfer support after cooling. The resulting artificial leather was very soft, bulky and fine grained and closely resembled natural leather. It was suitable for the manufacture of outerwear garments.

The invention is further illustrated but is not intended to be limited by the foregoing examples in which all parts and percentages are by weight unless otherwise specified.

It is to be understood that any of the components and conditions mentioned as a suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

We claim:
1. A process for the production of a composite material of homogeneous or microporous plastic sheet and a polyurethane foam wherein said process comprises:
 a. applying a film of liquid plastics coating compound to a transfer support where it is allowed to solidify resulting in a homogeneous or microporous plastic sheet;
 b. spread coating on said plastic sheet a polyurethane ionomer latex foam having a gross density of 0.04 to 0.40 g/cm³ produced by a churning process from an ionomeric polyurethane dispersion having
  i. a solids content of 45 to 62% by weight of polyurethane,
  ii. a viscosity of 10 to 70 seconds outflow time from a Ford measuring cup with a 4 mm nozzle,
  iii. a particle diameter of 0.05 to 1.0 μ,
  iv. an ionic group content of 2 to 40 milliequivalents per 100 g of polyurethane solids of ions selected from the group consisting of

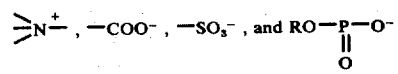

wherein R is hydrogen or a lower alkyl group, and
  v. a tensile strength of at least 40 kg/cm² when dried to a homogeneous polyurethane foil, and which contains
   i. 1–10% by weight of a foam stabilizing agent, based on the weight of solid polyurethane
   ii. 0–100% by weight of inorganic fillers based on the weight of solid polyurethane,
   iii. 0–30% by weight of crosslinking agent based on the weight of solid polyurethane, and
   iv. 0.1 to 10% by weight of thickener based on the weight of solid polyurethane; and
 c. thereafter removing said transfer support.

2. A process for the production of a composite material consisting of a homogeneous or microporous plastic sheet and a polyurethane foam wherein said process comprises:
 a. spreading on a transfer support a coating of an ionomer latex foam having a gross density of 0.04 to 0.40 g/cm³ produced by a churning process from an ionomeric polyurethane dispersion having
  i. a solids content of 45 to 62% by weight of polyurethane,
  ii. a viscosity of 10 to 70 seconds outflow time from a Ford measuring cup with a 4 mm nozzle,
  iii. a particle diameter of 0.05 to 10 μ, iv. an ionic group content of 2 to 40 milliequivalents per 100 g of polyurethane solids of ions selected from the group consisting of

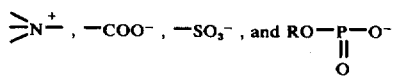

wherein R is hydrogen or a lower alkyl group, and
v. a tensile strength of at least 40 kg/cm² when dried to a homogeneous polyurethane foil, and which contains
 i. 1–10% by weight of a foam stabilizing agent, based on the weight of solid polyurethane,
 ii. 0–100% by weight of inorganic fillers based on the weight of solid polyurethane,
 iii. 0–30% by weight of crosslinking agent based on the weight of solid polyurethane, and
 iv. 0.1 to 10% by weight of thickener based on the weight of solid polyurethane;
b. while said foam is still liquid, applying thereto, using light pressure, a self-supporting homogeneous or microporous plastic sheet;
c. allowing the composite material to dry; and
d. removing said transfer support.

3. A process for the production of a composite material of a homogeneous or microporous plastic sheet and a polyurethane foam comprising:
a. spread coating onto a transfer support a polyurethane ionomer latex foam having a gross density of 0.04 to 0.40 g/cm³ produced by a churning process from an ionomeric polyurethane dispersion having
 i. a solids content of 45 to 62% by weight of polyurethane,
 ii. a viscosity of 10 to 70 seconds outflow time from a Ford measuring cup with a 4 mm nozzle,
 iii. a particle diameter of 0.05 to 1.0 μ,
 iv. an ionic group content of 2 to 40 milliequivalents per 100 g of polyurethane solids of ions selected from the group consisting of

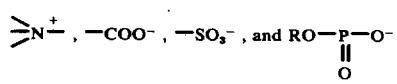

wherein R is hydrogen or a lower alkyl group, and
v. a tensile strength of at least 40 kg/cm² when dried to a homogeneous polyurethane foil, and which contains
 i. 1–10% by weight of a foam stabilizing agent, based on the weight of solid polyurethane,
 ii. 0–100% by weight of inorganic fillers based on the weight of solid polyurethane,
 iii. 0–30% by weight of crosslinking agent based on the weight of solid polyurethane, and
 iv. 0.1 to 10% by weight of thickener based on the weight of solid polyurethane,
b. allowing said foam to dry;
c. applying to the dried foam a liquid plastic coating compound;
d. allowing the plastic coating to dry and form a homogeneous or microporous plastic sheet; and
e. then removing said transfer support.

4. The process of claim 1 wherein a textile material or fleece is placed on the liquid foam, the foam is then allowed to dry and the transfer support is removed.

5. The process of claim 1 wherein the plastic sheet is a microporous or homogeneous polyurethane sheet.

6. The process of claim 1 wherein the plastic sheet is a polyvinyl chloride sheet.

7. A process for the production of a self-supporting polyurethane foam sheet comprising spread coating a polyurethane ionomer latex foam on a transfer support wherein the polyurethane ionomer is an ionomeric polyurethane dispersion comprising which has
a. a solids content of 45–62% by weight of polyurethane
b. a viscosity of 10 to 70 seconds outflow time from a Ford measuring cup with 4 mm nozzle.
c. a particle diameter of 0.05 to 1.0 μ
d. an ionic group content of

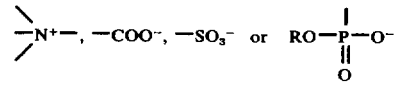

of 3–40 milliequivalents per 100 g of polyurethane solid content, fillers and which dispersion in addition contains
 i. 1–10% by weight of foam stabilizing agent, based on the polyurethane solid content.
 ii. 0–100% by weight of inorganic fillers, based on the polyurethane solid content,
 iii. 0–30% by weight of cross linking agent, based on the polyurethane solid content,
 iii. 0.1 to 10% by weight of thickeners, based on the polyurethane solid content.

8. The process of claim 7 wherein the ionomeric polyurethane dispersion has
a. 48 to 55% by weight of polyurethane
b. a viscosity of 20 to 50 seconds outflow time from a Ford measuring cup with a 4 mm nozzle,
c. a particle diameter of 0.07 to 0.30 μ and contains
 i. 3–8% by weight of foam stabilizing agent, based on polyurethane solid content,
 ii. 15–60% by weight, of inorganic fillers, based on the polyurethane solid content,
 iii. 5–12% by weight of cross-linking agent, based on the polyurethane solid content,
 iii. 10 to 5.0% by weight, of thickeners, based on the polyurethane solid content.

9. A process for the production of a composite material consisting of a plastic sheet, a polyurethane foam and a woven or knitted textile material or non-woven fleece comprising:
a. applying to a layer of plastic sheet a polyurethane ionomer latex foam having a gross density of 0.04 to 0.40 g/cm³ produced by a churning process from an ionomeric polyurethane dispersion having
 i. a solids content of 45 to 62% by weight of polyurethane,
 ii. a viscosity of 10 to 70 seconds outflow time from a Ford measuring cup with a 4 mm nozzle,
 iii. a particle diameter of 0.05 to 1.0 μ,
 iv. an ionic group content of 2 to 40 milliequivalents per 100 g of polyurethane solids of ions selected from the group consisting of

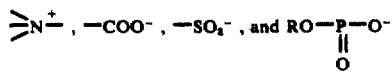

wherein R is hydrogen or a lower alkyl group and
v. a tensile strength of at least 40 kg/cm² when dried to a homogeneous polyurethane foil, and which contains
  i. 1–10% by weight of a foam stabilizing agent, based on the weight of solid polyurethane,
  ii. 0–100% by weight of inorganic fillers based on the weight of solid polyurethane,
  iii. 0–30% by weight of crosslinking agent based on the weight of solid polyurethane, and
  iv. 0.1 to 10% by weight of thickener based on the weight of solid polyurethane;
b. carefully placing with light pressure on the foam while still wet, a woven or knitted textile material or non-woven fleece; and
c. solidifying the composite material by drying.

10. A self-supporting polyurethane ionomer latex foam having a gross density of 0.04 to 0.40 g/cm³ produced from aqueous air whipped ionomeric polyurethane dispersions which have:

i. a solids content of 45 to 62% by weight of polyurethane,
ii. a viscosity of 10 to 70 seconds outflow time from a Ford measuring cup with a 4mm nozzle,
iii. A particle diameter of 0.05 to 1.0 μ,
iv. an ionic group content of 3 to 40 milliequivalents per 100 g of polyurethane solids of ions selected from the group consisting of

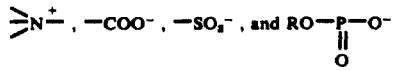

wherein R is hydrogen or a lower alkyl group, and
v. a tensile strength of at least 40 kg/cm² when dried to a homogeneous polyurethane foil, and which contain
  i. 1–10% by weight of a foam stabilizing agent, based on the weight of solid polyurethane,
  ii. 0–100% by weight of inorganic fillers based on the weight of solid polyurethane,
  iii. 0–30% by weight of crosslinking agent based on the weight of solid polyurethane, and
  iv. 0.10 to 10% by weight of thickener based on the weight of solid polyurethane.

* * * * *